US006941201B2

(12) United States Patent
Sudou

(10) Patent No.: US 6,941,201 B2
(45) Date of Patent: Sep. 6, 2005

(54) TRAVEL CONTROL APPARATUS FOR VEHICLES

(75) Inventor: Tsugio Sudou, Tokyo (JP)

(73) Assignee: Komatsu Ltd., Tokyo (JP)

( * ) Notice: Subject to any disclaimer, the term of this patent is extended or adjusted under 35 U.S.C. 154(b) by 119 days.

(21) Appl. No.: 10/701,427

(22) Filed: Nov. 6, 2003

(65) Prior Publication Data

US 2004/0143375 A1 Jul. 22, 2004

(30) Foreign Application Priority Data

Nov. 8, 2002 (JP) ....................................... 2002-325390

(51) Int. Cl.[7] ............................ B60R 21/00; G05D 1/02

(52) U.S. Cl. ........................... 701/23; 701/41; 701/208; 340/902

(58) Field of Search .............................. 701/23, 24, 25, 701/26, 41, 50, 208, 210, 117, 300, 301, 96; 340/902, 903, 435, 436, 438

(56) References Cited

U.S. PATENT DOCUMENTS

| | | | | | |
|---|---|---|---|---|---|
| 5,521,579 | A | * | 5/1996 | Bernhard | 340/438 |
| 6,253,128 | B1 | * | 6/2001 | Kageyama et al. | 701/23 |
| 6,292,725 | B1 | | 9/2001 | Kageyama et al. | |
| 6,484,078 | B1 | * | 11/2002 | Kageyama | 701/25 |

* cited by examiner

*Primary Examiner*—Tan Q. Nguyen
(74) *Attorney, Agent, or Firm*—Varndell & Varndell, PLLC

(57) ABSTRACT

This travel control apparatus for vehicles is provided with a fellow vehicle judgement device adapted to judge whether a fellow vehicle coming close to a subject vehicle traveling on a track is present or absent, and a device for shifting a traveling course of the subject vehicle when a judgement that a fellow vehicle coming close to the subject vehicle is present is given by the fellow vehicle judgement device, so as to have the subject vehicle traveling along a solo traveling course set on the track travel along a course set close to a shoulder of the track.

2 Claims, 8 Drawing Sheets

TRAVEL CONTROL APPARATUS FOR VEHICLES

BACKGROUND OF THE INVENTION

1. Field of the Invention

This invention relates to a travel control apparatus for vehicles, adapted to control vehicles, which travel in an autonomously induced manner on the basis of position measurement information, on a track having adjoining vehicle pass-by lanes for the purpose of having the vehicles pass each other.

2. Description of the Related Art

When ores are transported over a long distance, for example, from a mining site to processing facilities in an extremely large job site, such as a mine, a vehicle operating system which is designed to release workers from severe working environment by having special vehicles, such as unmanned dump trucks travel in an autonomously induced manner on the basis of preset course data and actual traveling data is employed (refer, for example, to U.S. Pat. No. 6,292,725).

In this vehicle operating system, adjoining vehicle pass-by lanes Ra, Rb are provided as shown in FIG. 7 on one track R connecting a mining site A and processing facilities B together. The system is formed so as to have vehicles T, T pass each other on a track R by making each vehicle T travel in an autonomously induced manner on the basis of a traveling course (course data) preset on the lanes Ra, Rb and traveling data (position, speed, etc.) obtained by utilizing a position measuring system, such as GPS.

As shown in FIGS. 8A and 8B, each of traveling courses Ca, Cb on lanes Ra, Rb of a track R is set in a position offset by a distance L from a relative shoulder on the basis of an induction margin e provided on an outer side of a vehicle T and a safety margin s1 of the shoulder.

The width (total width including up and down lanes) W of the track R is equal to the sum of the widths Tw of the vehicles T passing each other on the lanes Ra, Rb, those of the induction margins e provided on the left and right sides of the vehicles T, those of the safety margins s1 provided between the vehicles T and relative shoulders, and a safety margin s2 provided between the vehicles T, T passing each other. The width W is set larger than the sum of the widths Tw of the two vehicles T.

In order to improve the efficiency of the transportation work in the mine, increasing a traveling speed of the vehicles T is conceivable but an increase in the traveling speed causes the necessity of setting the various kinds of margins (e, s1, s2) large. As a result, the width W of the track R becomes uselessly large.

Such a track R in the above-mentioned mine is prepared by making a mountain to order when the mine starts being operated. In a large-scale mine, a track extends over ten-odd kilometers in total in some cases. Therefore, as the width W of the track R increases, the track creation cost and maintenance cost become higher.

SUMMARY OF THE INVENTION

The present invention has been made in view of these facts, and aims at providing a travel control apparatus for vehicles, capable of reducing the amount of money required for the creation and maintenance of a track, and attaining the improvement of the work efficiency in a job site.

To achieve the above and other objects, a travel control apparatus for vehicles according to a first invention is provided with a device for judging whether a fellow vehicle coming close to a subject vehicle traveling on a lane is present or absent, and a device for shifting a traveling course of the subject vehicle when the fellow vehicle judgement device judges that a fellow vehicle coming close to the subject vehicle is present, so as to have the subject vehicle traveling along a solo traveling course set on the relative lane travel along the portion of the lane which is closer to the relative shoulder.

According to this arrangement, when the fellow vehicle coming close to the subject vehicle is not present on the track, the subject vehicle traveling along the solo traveling course set on the track can travel at a high speed since a margin in a side region can be set large with respect to the sole traveling course. Therefore, a great improvement of the work efficiency in the job site comes to be attained.

According to this arrangement, when a fellow vehicle coming close to the subject vehicle is present on the track, the subject vehicle travels on the portion of the track which is closer to the relative shoulder. Therefore, a total width of the track can be reduced to as great an extent as possible by setting a margin needed to have the subject vehicle pass the fellow vehicle to the smallest possible level. Therefore, various kinds of expenses to be born with respect to the track including the expense for the creation of the track and the maintenance thereof can be reduced greatly.

To achieve the above objects, a travel control apparatus for vehicles according to a second invention is formed in the same manner as the apparatus according to the first invention, wherein the traveling course shifting device is adapted to shift the traveling course of the subject vehicle to a solo traveling course after the fellow vehicle and subject vehicle have passed each other.

According to this arrangement, the vehicles traveling on the track run along the sole traveling courses set on the track except when each of the vehicles passes the other. Since the vehicle traveling along the solo traveling course can travel at a high speed, an average speed of each vehicle on the track increases greatly, and a further improvement of the work efficiency in the job site comes to be attained.

BRIEF DESCRIPTION OF THE DRAWINGS

A preferred embodiment of the present invention will now be described with reference to the accompanying drawings, wherein.

DESCRIPTION OF PREFERRED EMBODIMENT

Figure 1:
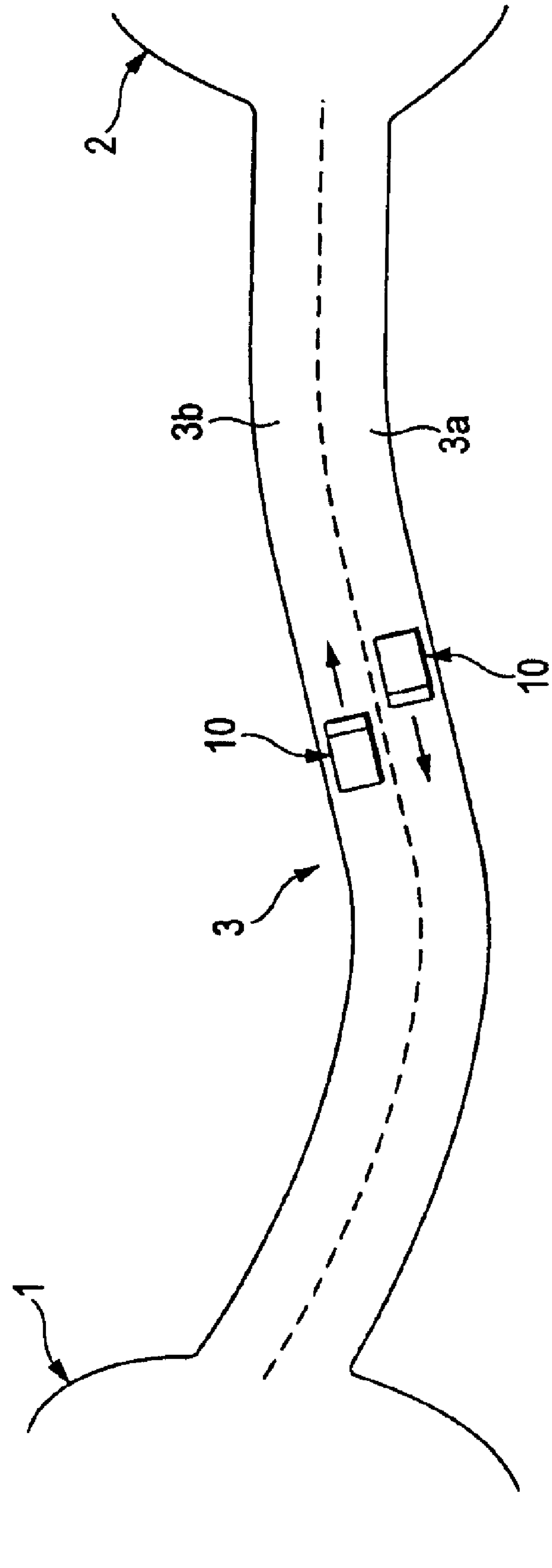
FIG. 1 is a conceptual drawing showing an example of a track in a mine.

The present invention will now be described in detail on the basis of what are shown in the drawings illustrating an embodiment thereof.

FIG. 1 shows an embodiment in which the travel control apparatus for vehicles according to the present invention is employed in a vehicle operating system in a mine. On a track 3 connecting a mining site 1 in a mine and processing facilities 2 in the mine together, adjoining up and down lanes 3*a*, 3*b* are provided. These pass-by lanes are formed so as to have vehicles (unmanned dump trucks) 10, 10 traveling on the track 3 pass each other by making the vehicles travel in an autonomously induced mode which will be described later.

Figure 2:
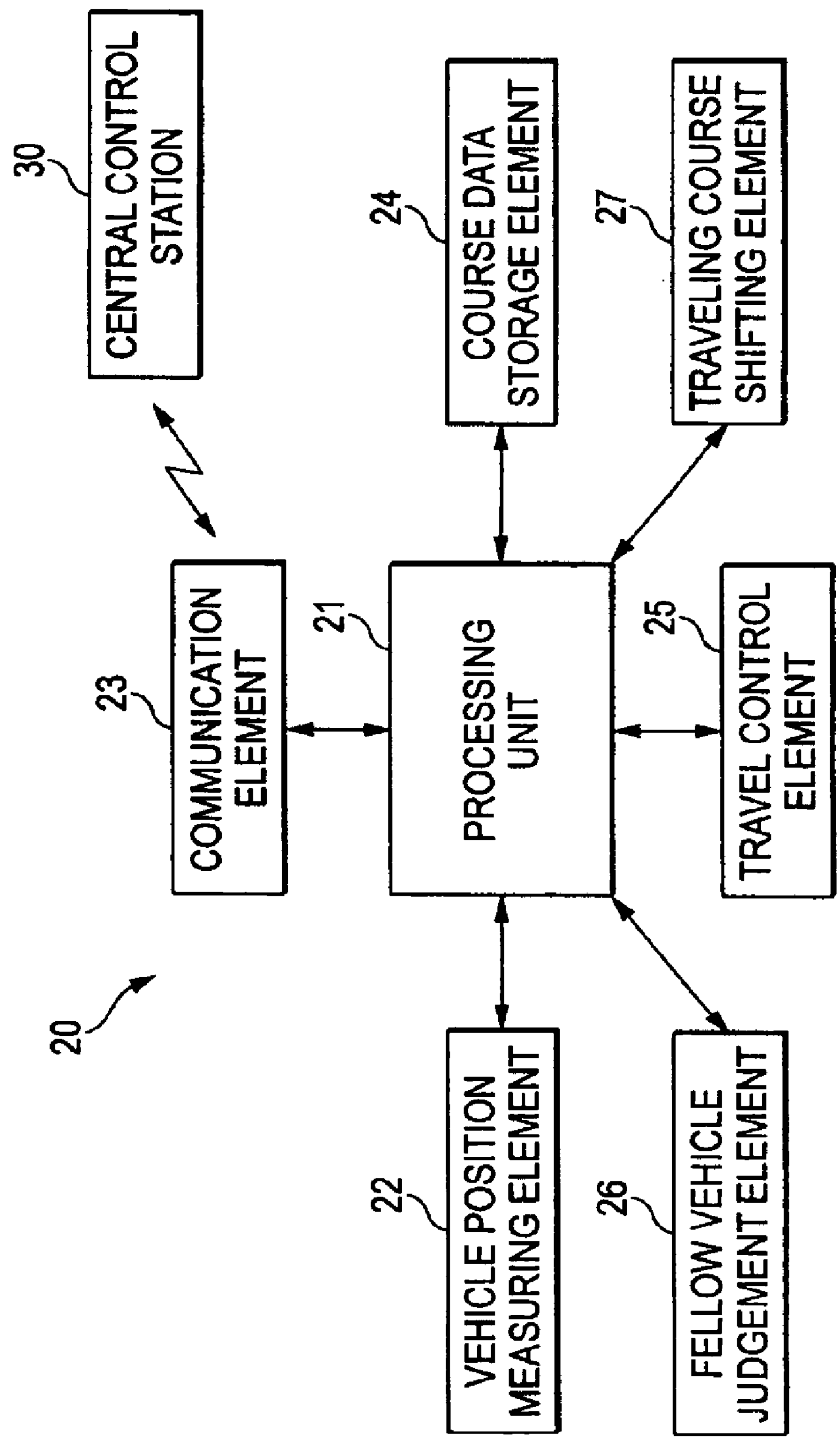
FIG. 2 is a block diagram showing a mode of embodiment of the travel control apparatus for vehicles according to the present invention.

Each vehicle 10 traveling on the track 3 is provided with such a travel control apparatus 20 as is shown in FIG. 2. This travel control apparatus 20 has a processing unit 21, a vehicle position measuring element 22, a communication element 23, a course data storage element 24, a travel control element 25, a fellow vehicle judgement element (fellow vehicle judgement device) 26 and a traveling course shifting element (traveling course shifting device) 27.

The vehicle position measuring element 22 provided in the travel control apparatus 20 is an element for measuring a traveling position (vehicle position) of the vehicle 10 at an actual point in time by using GPS (global positioning system) for obtaining position information, a wheel rotation sensor, and an optical fiber gyroscope for obtaining direction information.

The communication control element 23 in the travel control apparatus 20 is an element for sending the traveling data on each vehicle 10 from a central control station 30, which supervises all the vehicles 10, 10 . . . , to the vehicle 10, and vice versa.

Figure 3A:
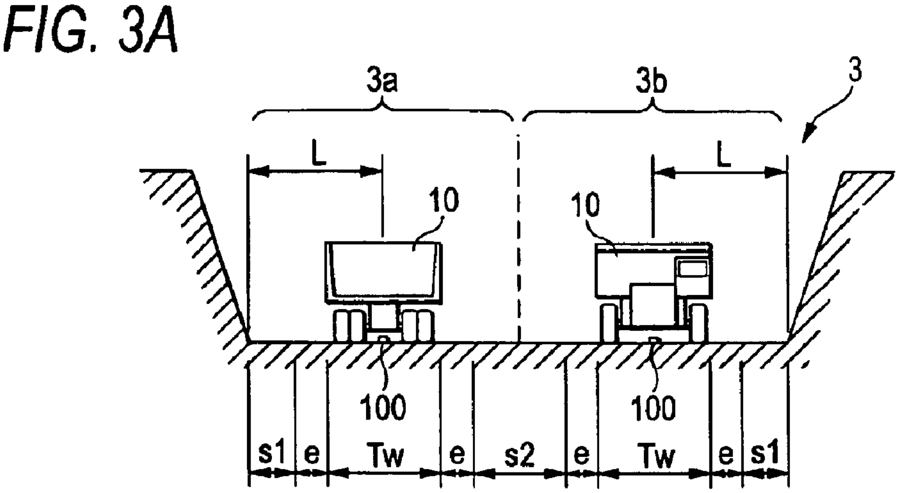
FIGS. 3A and 3B are sectional and plan views showing a mode of setting traveling courses on a track.
Figure 3B:
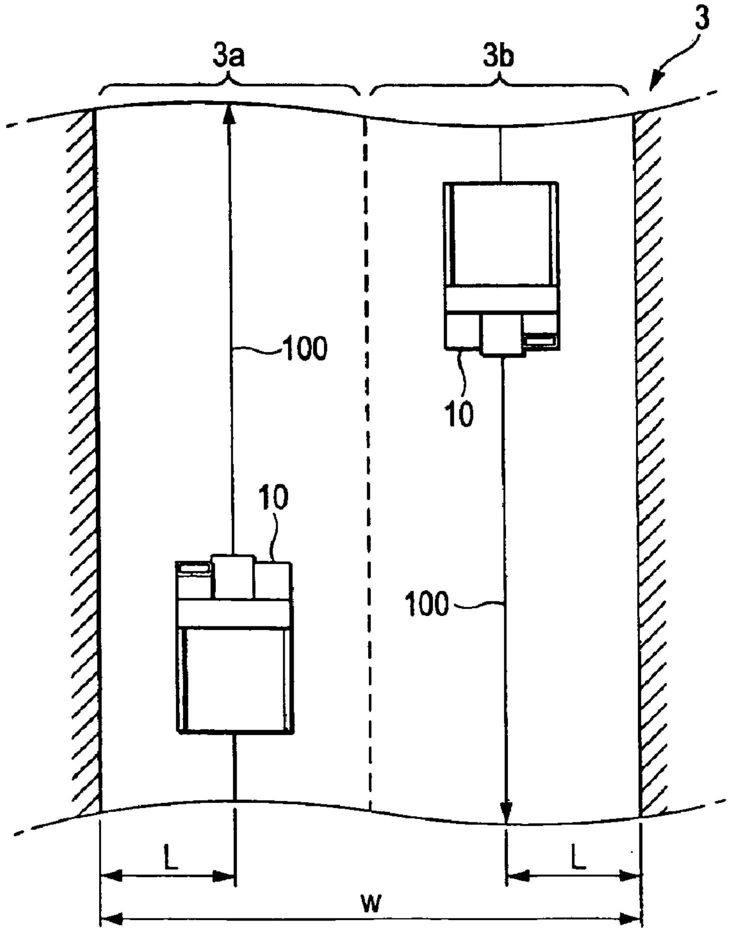

As shown in FIGS. 3A and 3B, the lanes 3*a*, 3*b* on the track 3 are provided with respective vehicle pass-by traveling courses 100 set thereon. Each of these pass-by traveling courses 100 is set in a position offset by a distance L from a relative shoulder on the basis of an induction margin e and a safety margin S1 provided on an outer side of the vehicle 10.

The width (total width of the track including the up and down lanes) W of the track 3 is equal to the sum of the widths Tw of the vehicles 10 which pass each other on the lanes 3*a*, 3*b*, those of the induction margins e provided on the left and right sides of the vehicles 10, those of safety margins S1 between outer edges of the induction margins and relative shoulders, and that of a safety margin s2 between adjacent edges of the inner induction margins e of the vehicles 10, 10 passing each other.

In this embodiment, each vehicle 10 on the track 3 travels in an autonomously induced manner basically on the basis of course data.

Namely, the processing unit 21 in the travel control apparatus 20 outputs a steering wheel control demand to the traveling control element 25 so that a deviation of the vehicle 10 from the traveling course is eliminated on the basis of the results of a comparison between the course data and traveling data (especially, position information) outputted from the vehicle position measuring element 22. This causes the vehicle 10 to travel along the traveling course on the track 3.

During this time, the processing unit 21 in the travel control apparatus 20 for the vehicles 10 sends the traveling data (position information and speed information) on the vehicles 10 to the central control station 30 via the communication element 23. In the central control station 30, the operation (for example, the designating of an object position of a travel) of each vehicle 10 is supervised on the basis of the traveling data sent from each vehicle 10 thereto.

The fellow vehicle judgement element 26 in the travel control apparatus 20 for the vehicles 10 judges whether the fellow vehicle coming close to the subject vehicle traveling on the track 3 is present or not, on the basis of the travel data (position information and speed information) on each of the vehicles 10, 10 . . . sent from the central control station 30.

The traveling course shifting element 27 in the travel control apparatus 20 for the vehicles 10 is an element for shifting the traveling course of the vehicle 10 to the vehicle pass-by traveling course 100 or a solo traveling course 110, which will be de described later, on the basis of the results (the presence or absence of the fellow vehicle) of a judgement made in the fellow vehicle judgement element 26.

Figure 4:
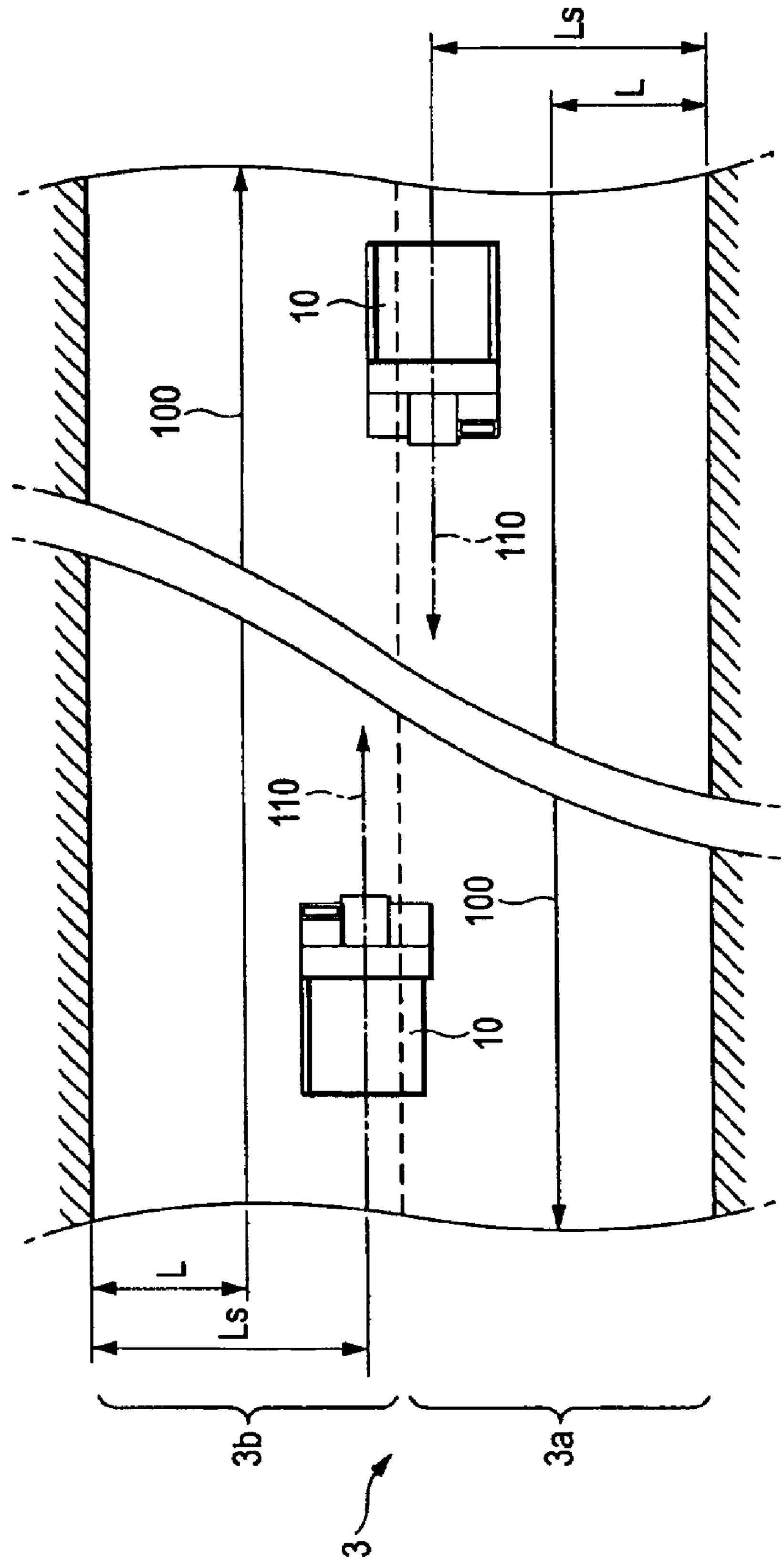
FIG. 4 is a plan view showing a mode of setting traveling courses.
Figure 5:
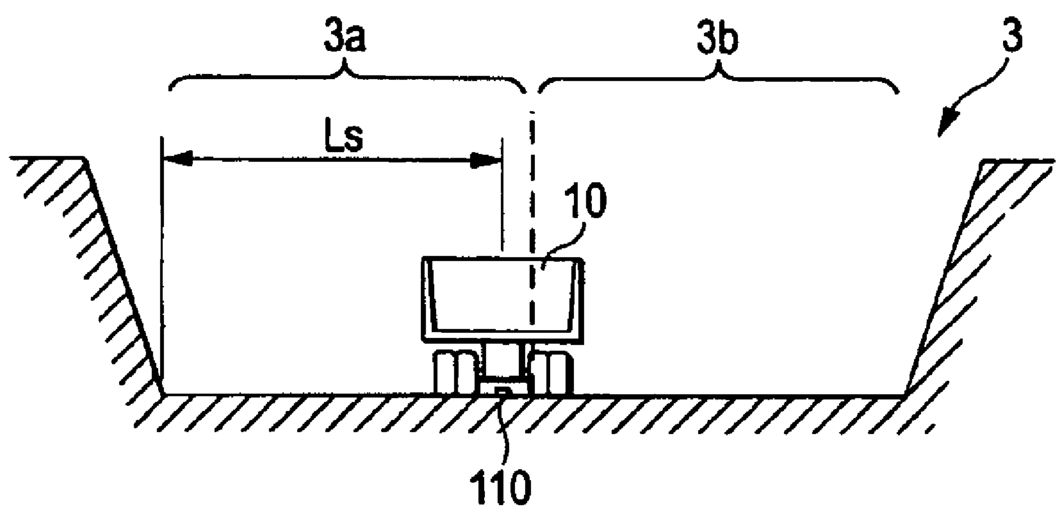
FIG. 5 is a sectional view of a track showing a vehicle traveling along a solo traveling course.

As shown in FIGS. 4 and 5, solo traveling courses 110 on the track 3 are made by shifting the data on the preset vehicle pass-by traveling courses 100 to the side of the center of the track 3 by a predetermined quantity respectively, i.e., the solo traveling courses are set to positions offset from the shoulders by a distance Ls respectively.

Since the distance Ls by which each solo traveling course 110 is offset from the relative shoulder is longer than a distance L by which each travel pass-by traveling course is offset from the relative shoulder, an induction margin and an safety margin can be set wider in the regions on the left and right sides of the vehicle 10 traveling along the solo traveling course 110 than those in corresponding regions with respect to the vehicle 10 traveling along the vehicle pass-by traveling course 100.

The data on the solo traveling course 110 are prepared by computing in the processing unit 21 in the travel control apparatus 20 the data on the vehicle pass-by traveling course 100 stored in the course data storage element 24 in the travel control apparatus 20.

When the vehicle 10 travels on the track 3 with a judgement that the fellow vehicle coming close thereto is absent given by the fellow vehicle judgement element 26 in the travel control apparatus 20, the vehicle 10 necessarily travels in an autonomously induced manner on the basis of the data on the solo traveling course 110.

The processing unit 21 in the travel control apparatus 20 prepares data on the solo traveling course 110 on the basis of the data on the vehicle pass-by traveling course 100 stored in the course data storage element 24, and outputs a steering wheel control command into the travel control element 25 so that a deviation of the position of the vehicle 10 from the solo traveling course 110 is eliminated on the basis of the results of a comparison between the data on the solo traveling course 110 and traveling data outputted from the vehicle position measuring element 22. Consequently, the vehicle 10 travels along the solo traveling course 110 on the track 3.

Since wide induction margin and safety margin can be set as mentioned above on the regions on the left and right sides of the vehicle 10 traveling along the solo traveling course 110, the vehicle 10 can travel at a high speed (for example, around 65 km/h, an upper limit speed of the vehicle) on the track 3.

On the other hand, when the vehicle 10 travels along the solo traveling course 110 on the track 3 with a judgement that the fellow vehicle coming close thereto is present on the track 3 given by the fellow vehicle judgement element 26 in the travel control apparatus 20, the shifting of the traveling course is done by the traveling course shifting device 27 in the travel control apparatus 20 so as to have the vehicle 10 travel along the vehicle pass-by traveling course 100.

In the fellow vehicle judgement element 26 in the travel control apparatus 20, a judgement whether a fellow vehicle on the same track 3 which comes close to the subject vehicle, in other words, a fellow vehicle having a fear of colliding with the subject vehicle in the future exists or not is given on the basis of the traveling data on the subject vehicle 10 and the traveling data on other vehicles 10, 10 . . . transmitted from the central control station 30.

When a judgement that a fellow vehicle coming close to the subject vehicle is present is given by the fellow vehicle judgement element 26, the traveling course shifting device 27 in the travel control apparatus 20 outputs a steering wheel control command to a travel control element 25 via the processing unit 21 on the basis of the traveling data (position information and speed information) on the subject and fellow vehicles by timing the outputting of the command so as to enable the avoidance of the collision of the two vehicles in such a manner that the vehicle 10 is induced to the vehicle pass-by traveling course 100. As a result, the vehicle 10 is shifted from the solo traveling course 110 to the vehicle pass-by traveling course 100.

When the vehicle 10 is shifted from the solo traveling course 110 to the vehicle pass-by traveling course 100, a speed control command with the steering wheel control command is outputted to the travel control element 25 via the processing unit 21, and the traveling speed of the vehicle 10 is reduced to as low as such a level (for example, around 50 km/h) that does not prevent the vehicle 10 from passing the fellow vehicle.

Figure 6A:
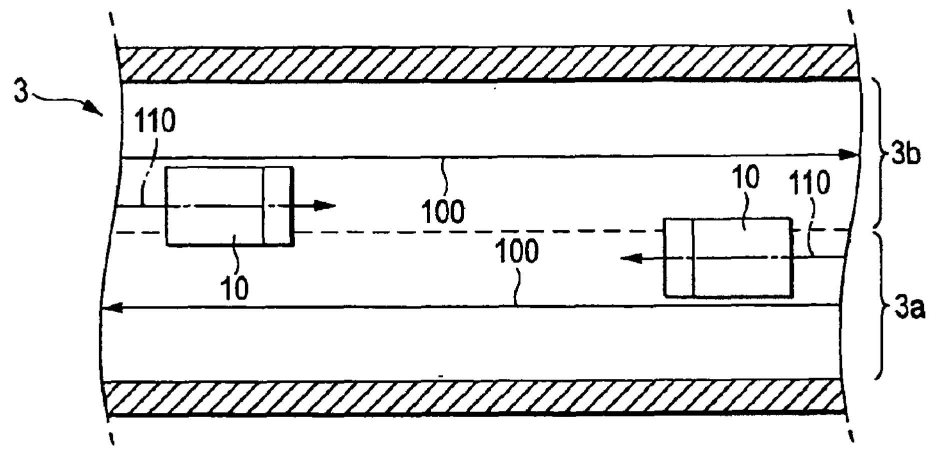
FIGS. 6A, 6B and 6C are conceptual drawings showing traveling modes of vehicles passing each other on the track.
Figure 6B:
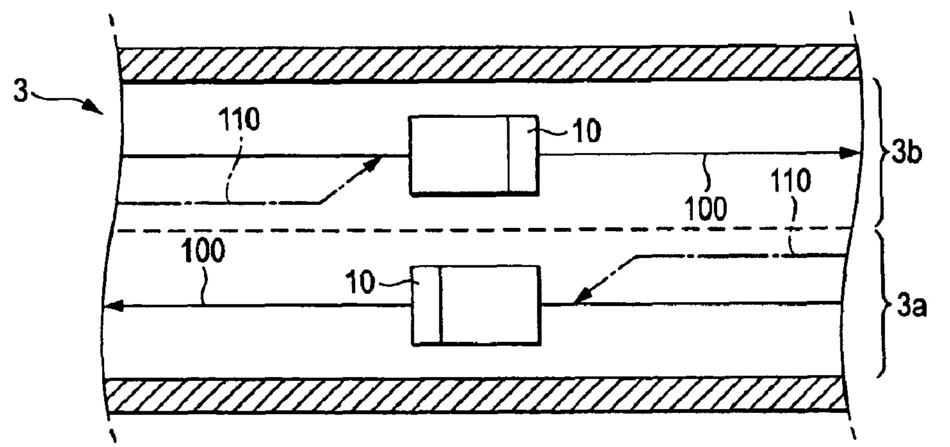

After the vehicle 10 is shifted to the vehicle pass-by course 100 as shown in FIG. 6B, the processing unit 21 in the travel control apparatus 20 outputs a steering wheel control command to the travel control element 25 so that a deviation of the position of the vehicle 10 from the vehicle pass-by traveling course 100 is eliminated. As a result, the vehicle 10 travels along the vehicle pass-by traveling course 100, and comes to pass the fellow vehicle without interfering therewith at all.

When a fellow vehicle coming close to the subject vehicle is not present on the track 3 as mentioned above, the vehicle. 10 traveling along the solo traveling course 110 set close to the center of the track 3 enables margins on the regions on both sides thereof to be set large on the solo traveling course 110. Therefore, the vehicle can travel at a high speed of, for example, around 65 km/h, so that a great improvement of the work efficiency in the job site comes to be attained.

On the other hand, when a fellow vehicle coming close to the subject vehicle is present on the track 3, the vehicle 10 travels along the vehicle pass-by traveling course 100 set close to the shoulder of the track 3. Therefore, when a margin needed to have the vehicle 10 pass the fellow vehicle on the vehicle pass-by traveling course 100 is set to a minimum level, the width of the track 3 can be set to the smallest possible level. This enables various costs concerning the track 3 including the cost of creating the track 3 and maintenance cost to be reduced greatly.

Assuming that the width of a track is set to 21.5 m so as to have vehicles pass each other at a speed of 50 km/h in a related art structure in which the vehicles are made to travel at all times on up and down lanes provided on the track. In order to have the vehicles to travel at a speed of 65 km/h close to an upper limit speed of the vehicles, the width of the track has to be increased to 26 m. Meanwhile, in an embodiment of the present invention described above, the vehicle 10 can be made to travel at a speed of 65 km/h, which is close to an upper limit speed of the vehicle, without increasing the width W of the track 3 at all even when the width W of the track is set to 21.5 m so as to have the vehicles pass each other at a speed of 50 km/h.

When the traveling speed of the vehicle 10 at the time at which the vehicle passes a fellow vehicle is further reduced, it becomes possible to narrow various margins needed on regions at left and right sides of the vehicle 10, and further reduce the width W of the track 3. However, it is a matter of course that the traveling speed of the vehicle 10 at the time at which the vehicle passes a fellow vehicle is set to a suitable level, which does not cause an average traveling speed thereof on the track 3 to lower greatly, on the basis of various conditions including a total length of the track 3.

According to this arrangement, the traveling course for the vehicle 10 is shifted depending upon the presence or absence of a fellow vehicle coming close thereto, so that the formation of a wake, which occurs due to the repeated travel of the vehicle 10 along the same course on the track 3, is minimized. This enables the maintenance of the track 3 to be carried out simply, and the vehicle 10 to travel stably.

After the vehicle 10 traveling along the vehicle pass-by traveling course 100 passes a fellow vehicle on the track 3, the traveling course shifting device 27 in the travel control apparatus 20 outputs a steering wheel control demand to the travel control element 25 via the processing unit 21 so as to induce the vehicle 10 to the solo traveling course 110. As a result, the vehicle 10 is shifted from the vehicle pass-by traveling course 100 to the solo traveling course 110.

When the vehicle 10 is then shifted from the vehicle pass-by traveling course 100 to the solo traveling course 110, a speed control command with the steering wheel control command is outputted into the travel control element 25 via the processing unit 21, and the traveling speed of the vehicle 10 is increased to, for example, around 65 km/h which is an upper limit speed of the vehicle.

The time at which the traveling course for the vehicle 10 is shifted from the vehicle pass-by traveling course 100 to the solo traveling course 110 can be set arbitrarily to an instant which is immediately after the time at which the vehicle 10 passes a fellow vehicle, or to an instant which is a predetermined period of time after the time at which the vehicle 10 passes a fellow vehicle, or to an instant at which the vehicle 10 is spaced from a fellow vehicle by a predetermined distance.

Figure 6C:
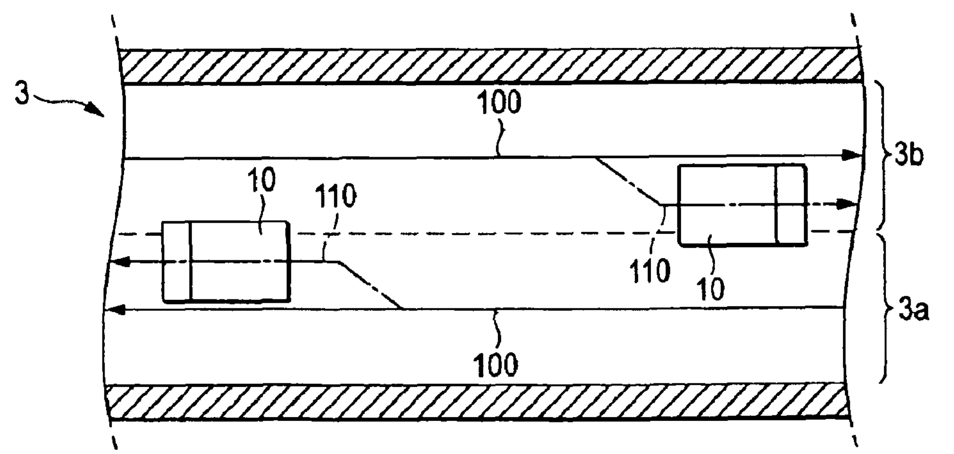
Figure 7:
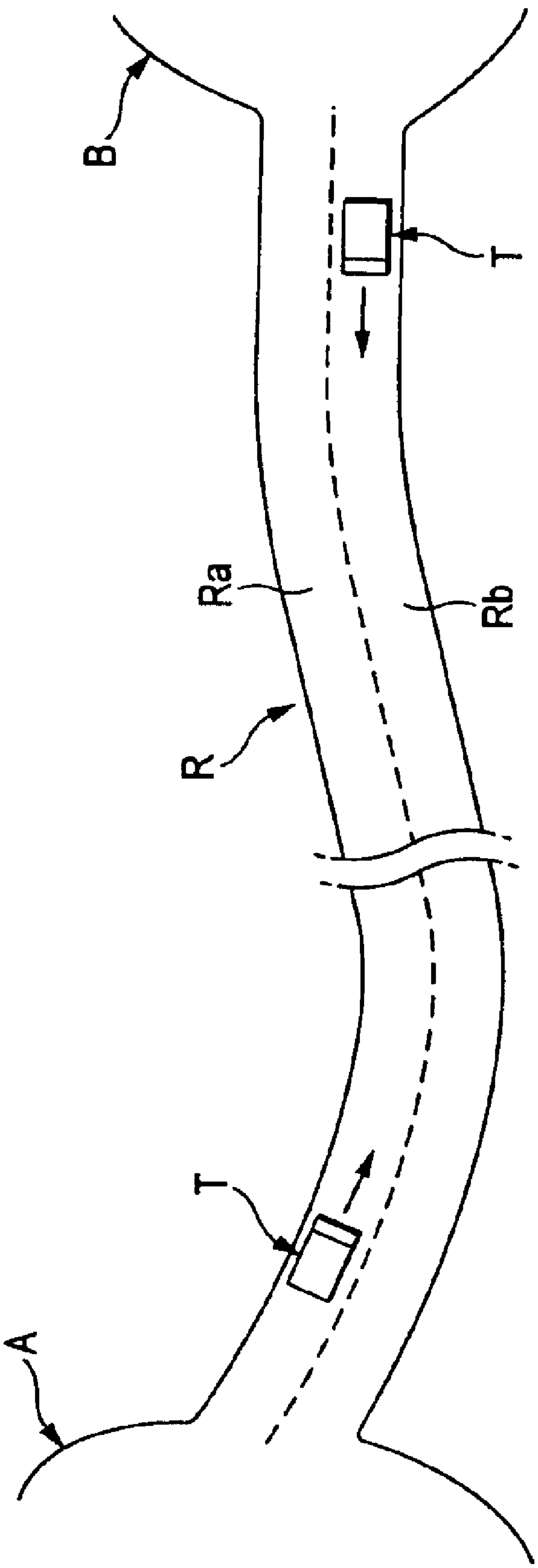
FIG. 7 is a conceptual drawing showing an example of a track in a mine.
Figure 8A:
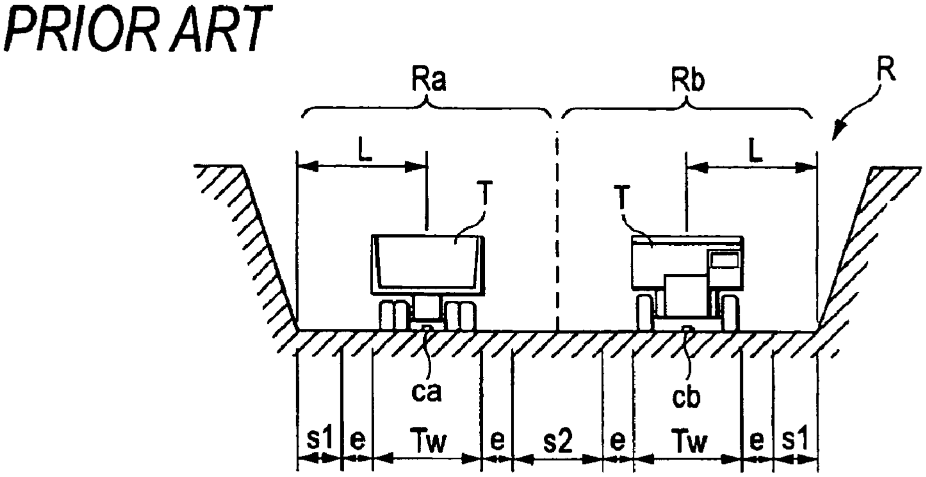
FIGS. 8A and 8B are sectional and plan views showing a mode of setting a traveling courses on a related art track.
Figure 8B:
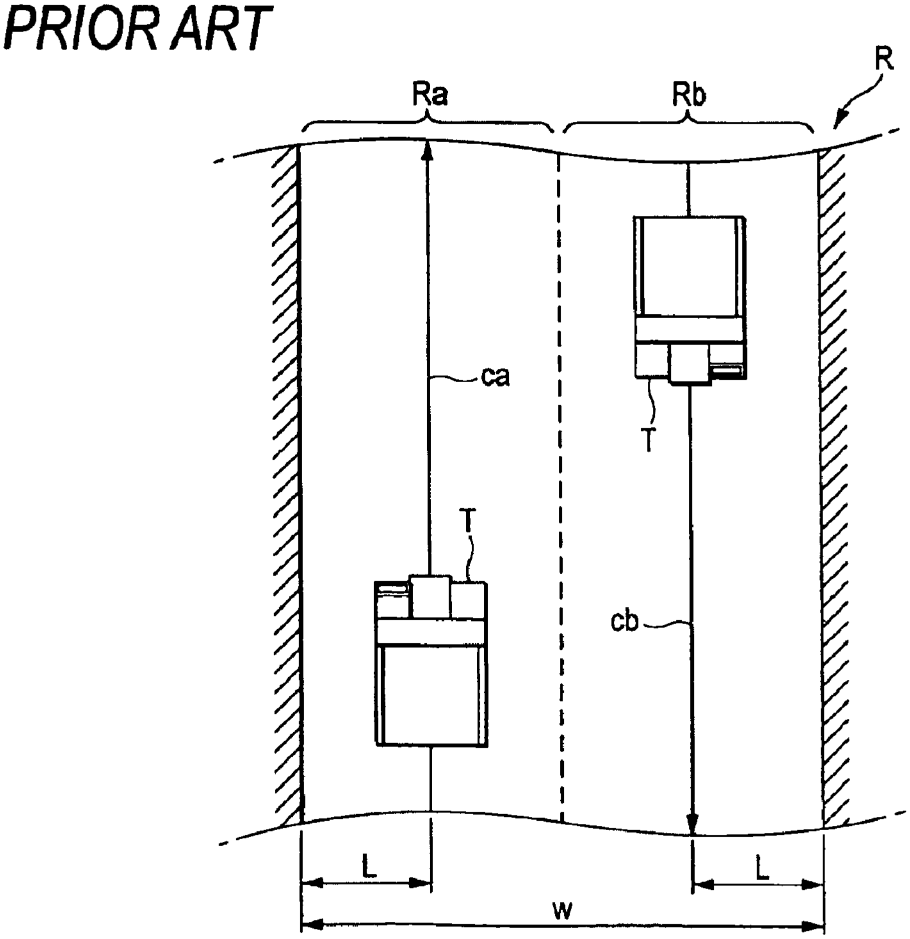

After the vehicle 10 is shifted to the solo traveling course 110 as shown in FIG. 6C, the processing unit 21 in the travel control apparatus 20 outputs a steering wheel control demand to the travel control element 25 so that a deviation of the vehicle 10 from the solo traveling course 110 is eliminated. As a result, the vehicle 10 travels along the solo traveling course 110 on the track 3.

In the above-described embodiment of the present invention, the vehicle 10 on the track 3 travels along the vehicle pass-by traveling course 100 only when the vehicle passes a fellow vehicle, and travels along the solo traveling course 110, which is set close to the center of the track, during other time except the time at which the vehicle passes the fellow vehicle. This enables a high-speed travel of the vehicle 10 along the solo traveling course 110 to be attained, and an average speed of the vehicle 10 on the track 3 to be increased greatly. Therefore, a further improvement of the work efficiency in a job site is attained.

After the vehicle 10 traveling along the vehicle pass-by traveling course 100 has passed a fellow vehicle, the vehicle 10 is not always necessary to shift the traveling course to the other (return the vehicle 10 to the solo traveling course 110). When the vehicle 10 is made to travel along the solo traveling course 110 until the vehicle passes a fellow vehicle on the track 3, an average speed of the vehicle 10 comes to be improved. Therefore, it is needless to say that the improvement of the productivity of ores owing to the traveling of the vehicle at a high speed on the track 3 is recognized.

In the above-described embodiment, the solo traveling courses 110 are set on the portions of the up and down lanes 3*a*, 3*b* which are close to the center of the track 3 by shifting the data on the vehicle pass-by traveling course 100 to those on the solo traveling course. The solo traveling course 110 may be set on a central region (on a boundary line between the lanes 3*a*, 3*b*) of the track 3, or in the other lane beyond the center of the track 3. In short, the solo traveling course 110 can be set in a suitable position on the track 3 as long as the position permits a sufficient margin to be secured in the regions on the sides of the traveling vehicle 10.

In the above-described embodiment, the vehicle pass-by traveling course 100 is set in advance on the track 3, and the data on the solo traveling course 110 are prepared by shifting the data on this vehicle pass-by traveling course 100 to the central side of the track 3. The solo traveling course 110 is set in advance on the track 3, and the data on the vehicle pass-by traveling course 100 may also be prepared by shifting the data on this solo traveling course 110 to the side of the shoulder of the track 3. The travel control apparatus may be formed so that the traveling courses are shifted to the other by selectively using a vehicle pass-by traveling course 100 and a solo traveling course 110 both of which are set in advance.

In the above-described embodiment, the computation of the data on the courses, the presence or absence of a fellow vehicle and the timing of the shifting of a traveling course are arithmetically processed in an individual vehicle 10. The travel control apparatus may also be formed so that the apparatus controls each vehicle 10 by carrying out these computations in the central control station 30, and using a command signal sent from the central control station 30 on the basis of the results of the computation.

In the above-described embodiment, the presence or absence of a fellow vehicle coming close to the vehicle 10 traveling on the track 3 is judged on the basis of the traveling data (position information and speed information) on the fellow vehicle sent from the central control station 30 via the communication element 23. The travel control apparatus can also be formed so that the presence or absence of a fellow vehicle coming close to the vehicle 10 is judged by detecting the position and speed of the fellow vehicle by a sensor mounted on each vehicle 10.

In the above-described embodiment, an example in which the travel control apparatus for vehicles according to the present invention is applied to an operating system in which all the vehicles on the track are generally controlled in the central control station is shown. It is a matter of course that the travel control apparatus for vehicles according to the present invention can also be effectively applied to an operating system in which all the vehicles on the track are generally controlled by communicating traveling data between each vehicle 10.

What is claimed is:

1. A travel control apparatus for vehicles, adapted to have a subject vehicle traveling in an autonomously induced manner on the basis of position measurement information pass a fellow vehicle on a track provided with adjoining up and down lanes, comprising:

a fellow vehicle judgement device adapted to judge whether the fellow vehicle coming close to the subject vehicle traveling on the track is present or absent, and a device for shifting a traveling course of the subject vehicle when a judgement that the fellow vehicle coming close to the subject vehicle is present is given by the fellow vehicle judgement device, so as to have the subject vehicle traveling along a solo traveling course set on the track travel along a course set close to a shoulder of the track.

2. The travel control apparatus for vehicles according to claim 1, wherein the traveling course shifting device is adapted to shift the traveling course along which the subject vehicle travels to the solo traveling course after the subject vehicle passes the fellow vehicle.

* * * * *